United States Patent
Depta

(10) Patent No.: US 6,712,613 B2
(45) Date of Patent: Mar. 30, 2004

(54) DISPLAY DEVICE SUITED FOR A BLIND PERSON

(75) Inventor: Robert Depta, Augsburg (DE)

(73) Assignee: Fujitsu Siemens Computers GmbH, München (DE)

( * ) Notice: Subject to any disclaimer, the term of this patent is extended or adjusted under 35 U.S.C. 154(b) by 199 days.

(21) Appl. No.: 09/941,588

(22) Filed: Aug. 30, 2001

(65) Prior Publication Data

US 2002/0024533 A1 Feb. 28, 2002

(30) Foreign Application Priority Data

Aug. 31, 2000 (DE) .......................................... 100 42 950
Aug. 31, 2000 (DE) .......................................... 100 42 949

(51) Int. Cl.⁷ .............................................. G09B 21/00
(52) U.S. Cl. ..................... 434/114; 434/112; 434/113; 341/22; 345/173
(58) Field of Search ................. 434/112–118; 345/156, 345/163; 382/114; 341/22; 200/5 A; 709/223; 400/124.14

(56) References Cited

U.S. PATENT DOCUMENTS

| | | | |
|---|---|---|---|
| 3,848,608 A | | 11/1974 | Leonard |
| 4,033,053 A | * | 7/1977 | Engler .......................... 434/114 |
| 4,831,218 A | * | 5/1989 | Wright .......................... 200/5 A |
| 4,881,900 A | * | 11/1989 | Matsuoka et al. ........... 434/113 |
| 4,898,536 A | * | 2/1990 | Hoffarth ...................... 434/114 |
| 5,065,434 A | * | 11/1991 | Matsuoka et al. ........... 382/114 |
| 5,557,269 A | * | 9/1996 | Montane ....................... 341/22 |
| 5,736,978 A | * | 4/1998 | Hasser et al. ................ 345/173 |
| 5,878,154 A | | 3/1999 | Schimmelpfennig |
| 5,912,660 A | * | 6/1999 | Gouzman et al. ............ 345/163 |
| 6,008,727 A | * | 12/1999 | Want et al. ............... 340/572.1 |
| 6,243,074 B1 | * | 6/2001 | Fishkin et al. ............... 345/156 |

FOREIGN PATENT DOCUMENTS

| | | |
|---|---|---|
| AT | 386 335 | 8/1988 |
| DE | 2 261 975 | 6/1973 |
| DE | 23 30 403 | 1/1975 |
| DE | 37 20 279 | 12/1988 |
| DE | 197 11 125 | 9/1998 |
| JP | 5-333765 | * 12/1993 |

* cited by examiner

Primary Examiner—Joe H. Cheng
(74) Attorney, Agent, or Firm—Cohen, Pontani, Lieberman & Pavane

(57) ABSTRACT

A display device which displays image information in a form perceivable by a blind person. For this purpose, the display device has a plurality of areally arranged elements (1), which are individually actuatable, and an actuation device for actuation of the elements (1), whereby through the elements (1), electronic image information (7) fed into the evaluation device (16) is tangibly represented through the elements (1). The actuator elements may be arranged areally on a flexible substrate (13), which are individually actuatable, whereby through the actuator elements (11), vibrations and/or heat and/or electrical impulses can be generated.

27 Claims, 2 Drawing Sheets

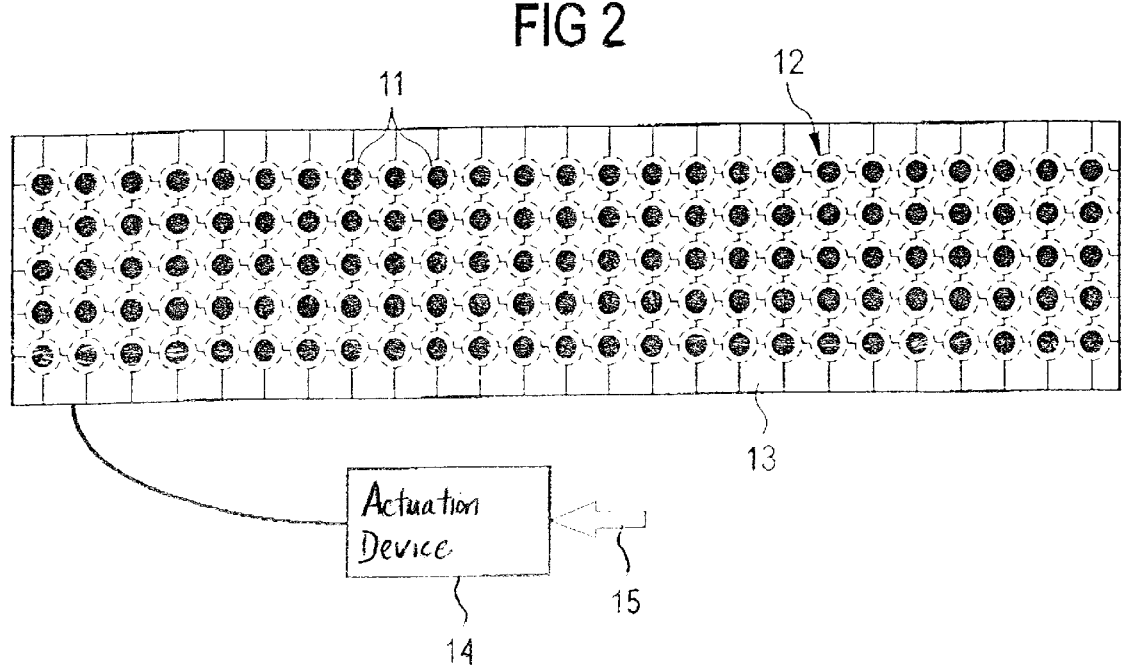
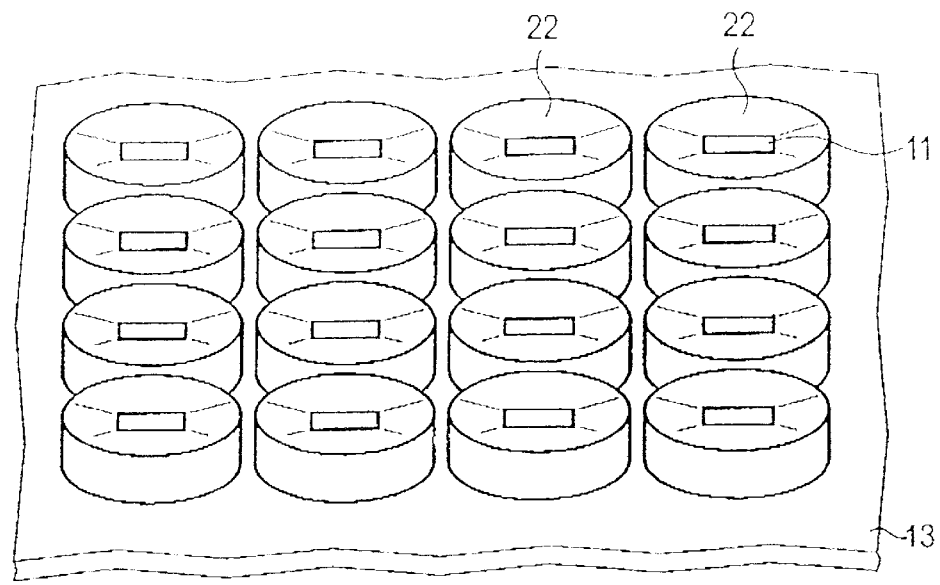

DISPLAY DEVICE SUITED FOR A BLIND PERSON

CROSS-REFERENCE TO RELATED APPLICATIONS

This application claims benefit of priority under 35 USC § 119 to German Patent Application No. 100 42 949.1, filed Aug. 30, 2000 and German Patent Application No. 100 42 950.5, filed Aug. 30, 2000, the entire contents of which are incorporated by reference herein.

BACKGROUND OF THE INVENTION

Field of the Invention

The invention relates to a display device which is especially suited for blind persons. In order to enable blind persons to also be able to read, the so-called Braille system of writing was developed where figures and numbers are represented as coded patterns. Small stampings for example on coins or in a book are tangible for blind persons and can consequently be comprehended. With special typewriters for the blind, individually written characters are first integrated in a line before a perforation or stamping of a substrate, which as a rule consists of paper, takes place.

In the meantime, with an almost complete permeation of the working world by electronic devices such as computers, blind persons are constantly confronted with the problem of not being able to comprehend the content on video screens. Particularly, FIGS. and numbers can be communicated through Braille in connection with the use of special accessory devices, but graphic representations, such as, for example, diagrams or tables, are now as before incomprehensible and cannot be inputted.

In addition, it is not possible to communicate to a blind person an image of their environment by means of Braille since this too requires a graphic representation.

SUMMARY OF THE INVENTION

One objective of the present invention is thus to propose a display device that makes it possible to make electronic image information normally represented on a video screen and comprehensible through the human sense of vision or the image of the environment comprehensible for the blind as well.

The objective is accomplished by a display device with a large number of areally arranged elements, i.e., elements arranged in an area of a surface on the device, preferably a substantially flat surface, which can be actuated individually, and an actuation device for actuation elements, whereby electronic image information fed to the actuation device is tangibly represented through the elements. Moreover the objective is accomplished through a display device with a large number of actuator elements areally arranged on a flexible substrate which are individually actuatable, whereby vibrations and/or heat and/or electrical impulses can be generated through the actuator elements.

The mode of operation of the actuator device is based upon the physiological fact that the finger pads and other specific skin regions react especially sensitively to microvibrations and heat. The scanned results are retained in short term memory owing to which, after a learning phase, the possibility arises of compiling an overall image of the individual readings in the brain. A flexible execution of a display device of the invention can be installed on unobtrusive places on the skin, and it is particularly suitable if, for orientation in an unfamiliar environment, a display apparatus should be carried along for a mobile orientation system.

Advantageously, the elements are arranged in a matrix. Even complex graphic image information can be represented comprehensively or tangibly through small matrix elements with a corresponding size of the overall matrix. In various configurations of the invention, the elements generate vibration, heat or electrical impulses, for example microdischarges. In a further improvement, the frequency of the vibrations can be controlled in an especially advantageous configuration, representation possibilities are combined. In this way, additional information, for example the three dimensional properties of the objects represented or color differences can be represented. Making an input possible through an input device with a great number of areally arranged sensor elements, which are individually readable, and an evaluation device for evaluating the information of the scanned sensor elements is advantageous, whereby through the input device, an image generated by mechanical contact with the sensor elements is convertible into electronic image information. Sensor elements are in this way simply realized in that the matrix elements are additionally outfitted with sensory properties.

In a configuration especially advantageous for work with computers, the display device is supplemented with a sign input device which consists of a known Braille system input unit, a loudspeaker and function keys. When using the display device as an electronic book, the display device is provided with a read-in device which can read in conventional books through a camera or for example a scanner. Furthermore, it is possible to provide a device for reading in electronic data carriers, for example diskettes or CD ROMs. By supplementation with further functional units, the display device can be operated as an independent system.

Another special read in device is to be designed for receiving image information from the environment. By a combination with an image recognition system and a flexible construction of a display device of the invention, a portable orientation system is realizable.

In constructing the display device with a flexible substrate, the display device can be positioned at the most varied of sites, for example, unobtrusively on the back, the neck or on the forehead. There specially designed caps, hats or headbands are conceivable, whereby the display device fastened thereupon lies directly on the forehead. Since the display device constantly lies on the skin, it is advantageous if a skin tolerable material is selected as a substrate material, for example medical silicon. If the casing of the actuator elements is constructed suction cup-like, an especially good contact between the actuator elements and the skin arises owing to the suction on the skin, and therefore an especially good perception.

A display device of the invention is advantageously worn on a part of the body at which the density of nerve endings is as great as possible. In any case, it makes no sense to arrange a display device with a high resolution on a site on the body with a low number of nerve endings.

Further particularities and configurations of the invention are indicated in the description of the preferred embodiment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 depicts a flexible display device in a schematic representation, and FIG. 3 illustrates the configuration of the casing of an actuator element as a suction cup, likewise in schematic representation.

DESCRIPTION OF THE PREFERRED EMBODIMENTS

Figure 1:
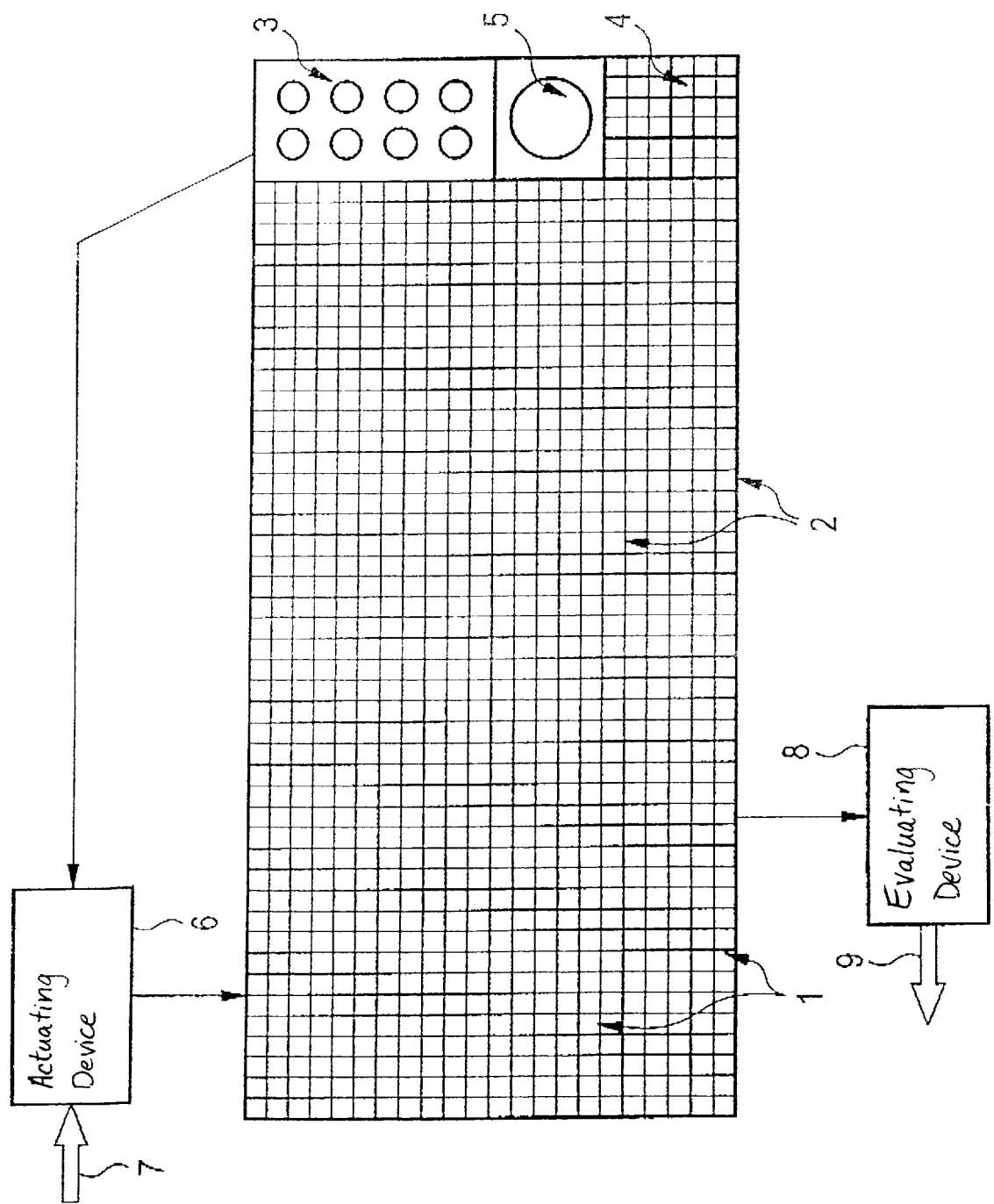
FIG. 1 shows a combined display and input device which is equipped for use on a computer with function buttons and a loudspeaker.

Referring now to the drawings, wherein like reference numerals designate identical or corresponding parts throughout the several views, the invention is next explained below on the basis of embodiments.

In the embodiment represented in FIG. 1, the display device is realized as a matrix.

The matrix has a large number of elements 1 which are separated from one another by insulation frames 2. The elements are individually and cyclically controlled as is basically known in connection with video screens. One objective of the insulation frames consists in separating the elements from each other such that an individual actuation is ensured without for example vibrations or heat extending into neighboring elements. In order to assure good recognizability, it is important for the properties of each individual element to be controllable separately and independently from other elements. The separation of the matrix elements is electrical as well as mechanical and thermal. In relation to the actuation of thermal properties, it is important that the insulation frames also have a small thermal capacity so that rapid temperature changes are possible. The resolution of the display device is determined by the dimensioning of the matrix elements 1 as well as by the construction of the insulation frame 2.

The matrix elements 1 are, as already explained, actuatable in several characteristics. For generating heat, an infrared sensor comes into consideration here, a voltage sensor can generate electrical impulses and for generating oscillations, piezo elements as well as micromechanical or magneto-strictive elements are usable.

The various image information is now imaged in that the nerves of the finger sense the stimuli arising, namely thermal, mechanical and/or electrical with different apertures of the surface touched when sliding over the active matrix elements. In this way, very realistic, almost three dimensional images can arise in the brain. The simplest method is the generation of image information through mechanical oscillations of the elements. The other methods require more exercise and are dependent upon external temperature and humidity as well as the mental constitution of the user. The combined solution has the advantage that at the same time several nerve cells that are competent for different stimulus recognitions are addressed, and one can, in this way, obtain a better resolution of graphic information. Through the different types of stimuli, various contours as well as various shapes and color tones can be transmitted to the user.

The objective of the display device lies in transforming electronic image information 7 and actuating the elements such that an "image" which is interpretable for the user is generated on the matrix. Since perceptibility is individually variable, the processing options of the actuation device 6 is adjustable.

A block with function keys 3 and an input unit 4 for Braille script is provided as an input device. By laying the fingers on the input fields of the input unit for Braille script, coded signs can be read by the device and be converted into figures and numbers by an OCR module. The display takes place through the previously described display device. The processing options of the actuating device 6 can be adjusted especially through the function keys 3.

A loudspeaker 5 is provided as a further display device.

Further possible applications for the display device consist in the use as a TV video screen or even in connection with a video camera as an "eye" in normal life. With the last mentioned application, it is advantageous to use two cameras so that when using the appropriate software, which, for example, undertakes contour transformation and contrast alteration, even three dimensional images can be generated.

The elements 1 may also have sensory properties for sensing mechanical contact and generating output signals which are transmitted to an evaluation unit 8 for generating electronic image information 9 based on the output signals. The electronic image information 9 generated by the evaluation unit 8 defines an image created by the mechanical touching.

In the embodiment represented in FIG. 2, the display device is realized as a matrix with a flexible support 13. The matrix has a large number of actuator elements 11, which are separated from one another by casings 12. The actuator elements are individually and cyclically controlled, as is chiefly known from video screens. The objective of the casings among other things consists in separating the actuator elements 11 from each other such that an individual actuation is assured without, for example, vibrations or heat being able to extend to neighboring elements. In order to assure a good recognzability, it is important for the properties of each individual actuator elements to be actuatable separately and independently of other actuator elements. The separation of actuator elements 11 in the matrix is electrical as well as mechanical and thermal. With reference to the actuation of thermal properties, it is important that the casings also have a small thermal capacity so that rapid temperature changes are possible. The resolution of the display device is determined by the dimensioning of the matrix elements 11, the construction of the casings 12 as well as the density of the nerve endings at the place in the body where the display device is installed.

The actuator elements 11 are actuatable in several properties. For generating heat, an infrared sensor comes into consideration in this connection. A voltage sensor can generate micro-discharges, and for generation of oscillations, piezo elements as well as micromechanical elements or magneto-strictive elements are usable.

The material of a flexible support 13 should either have air-permeable properties, or interstices should be left free between the actuator elements 11 in order not to hinder skin respiration during several hours of wearing time. The density of the actuator elements is correspondingly selected in harmony with the nerve distribution and the stimulus resolution possibilities of the skin parts selected for wearing.

Various modes of actuation are possible for mode of operation of the display device. In one actuation variant, all actuator elements 11 are simultaneously actuated. In another variant, individual image elements, for example also letters, are transmitted one after the other with adjustable time intervals. Which mode is preferred depends upon the information to be represented as well as upon individual preferences and opportunities of a user.

An actuation device 14 is connected with the display device. Information 15 to be represented is transmitted to the actuation device 14. The objective of the actuation device 14 now lies in transforming electronic information 15 and actuating the actuator elements 11 such that an "image" which is interpretable for the user is generated by the actuator elements 11 of the display device. Since perceptive capacity is individually variable, processing options of the actuator device 14 should be adjustable.

In an advantageous application of the display device of the invention, the information 15 contains data on the environment of the user of the display device. For example, an image recognition unit with optical cameras is connected in series in front of the display device 14. The cameras receive objects in the environment, an image recognition unit recognizes the objects and transmits the information to the display device 14. This transforms the information such that the actuator elements 11 are suitably actuated.

Through the combination of actuator elements which emit vibrations with those which generate heat or electrical impulses, the resolution can be basically increased or additional information can be transmitted. Further parameters for generating display information are the frequency and amplitude of the vibrations or the heat or the electrical impulses. Thus, in addition to contours of objects in the environment, their color can also be communicated to the user. In addition to the presence of objects, their distance from the user is representable. The brain can subsequently generate a three dimensional image on the basis of the information given.

How the suction cup-like configuration of the casings 22 can be constructed is represented in FIG. 3. The actuator elements are arranged matrix-like, whereby the distance between the matrix elements 11 is adapted to the density of nerve endings of the skin. The size of the casings 22 can be selected depending upon the distance between the actuator elements 1. The casings 22 in the embodiment depicted widen conically upwardly the typical suction sup shape arises. The casings 22 are advantageously manufactured of silicon, just like the flexible support 13.

Numerous modifications and variations of the present invention are possible in light of the above teachings. It is therefore to be understood that within the scope of the appended claims, the invention may be practiced otherwise than as specifically described herein.

We claim:

1. A display device comprising:
    a plurality of elements arranged on a surface area of a support, said elements being individually actuatable to generate on said surface area a representation of an image defined by input electronic image information, said representation of said image being adapted to be detected from said elements by touch, and said elements also being individually operable to generate an output in response to mechanical touching of said elements;
    an actuation device configured to receive the input electronic image information and to actuate said elements to generate the representation of the image defined by the input electronic image information that is detectable by touch; and
    an evaluation device for evaluating the output generated by said elements in response to mechanical touching of said elements, said evaluation device converting said output into output electronic image information defining an image generated by said mechanical touching.

2. The display device according to claim 1, wherein said elements are arranged in a matrix.

3. The display device according to claim 1, wherein said actuation device is configured to actuate selected ones of said elements in correspondence with the input electronic image information, the image defined by the input electronic image information having signs and graphics.

4. The display device according to claim 1, wherein said actuation device is configured to actuate said elements with vibrations, electrical impulses or heat.

5. The display device according to claim 4, wherein said actuation device controls at least one parameter selected from the group consisting of (a) frequency and amplitude of the vibrations, (b) frequency and amplitude of heat, and (c) frequency and amplitude of the electric impulses.

6. The display device according to claim 1, wherein said elements are separated from each other by an insulation frame.

7. The display device according to claim 1, 2, 3, 4, 5 or 6, wherein said display device is connected with at least one of a Braille input device and a function keypad.

8. The display device according to claim 1, wherein said support is made of silicon.

9. A display device comprising:
    a plurality of actuator elements, arranged in a surface area on a flexible substrate, said actuator elements being individually actuatable to generate at least one of vibrations, heat, and electrical impulses upon actuation, said actuator elements being further operable to generate an output in response to mechanical touching of said actuator elements,
    an actuation device configured to receive input electronic image information defining an image and to actuate said actuator elements such that said actuator elements generate a representation of the image defined by the input electronic image information that is adapted to be sensed from said actuator elements by touch, and
    an evaluation device for evaluating the output generated by said actuator elements in response to mechanical touching of said actuator elements, said evaluation device converting said output into output electronic image information defining an image generated by the mechanical touching.

10. The display device according to claim 9, wherein the image defined by said input electronic image information describes a user's surroundings.

11. The display device according to claim 9, wherein said actuation device controls at least one set of parameters selected from a group consisting of (a) frequency and amplitude of the vibrations, (b) frequency and amplitude of heat, and (c) frequency and amplitude of the electrical impulses.

12. The display device according to claim 9, wherein said actuator elements are separated from each other by a casing.

13. The display device according to claim 9, wherein each of said actuator elements has a suction cup casing for creating suction on a skin.

14. A display device for displaying information, comprising:
    actuatable means for representing an image defined by an input electronic image information, said actuatable means being arranged in a surface area of a support and individually actuatable, said actuatable means further comprising sensorial means for sensing mechanical touching and generating an output in response to the mechanical touching;
    actuation means for receiving the input electronic image information and for actuating the said actuatable means such that said actuatable means generates a representation of the image defined by the input electronic image information that is detectable from said actuatable means by touch; and evaluation means for evaluating said output generated by said sensorial means in response to the mechanical touching of said sensorial means and converting said output into electronic image information defining an image generated by the mechanical touching.

15. The display device according to claim 14, wherein said actuatable means is actuated with vibrations, electrical impulses or heat.

16. The display device according to claim 14, wherein the actuation means controls at least one parameter from a group consisting of (a) frequency and amplitude of the vibrations, (b) frequency and amplitude of heat, and (c) frequency and amplitude of the electric impulses.

17. The display device according to claim 14, wherein the actuatable means is connected with at least one of a Braille input means and a function keypad.

18. A display device for displaying information, comprising actuatable means for representing an image defined by an input electronic image information, said actuatable means being individually actuatable to generate at least one of vibrations, heat, and electrical impulses upon actuation, said actuatable means further comprising sensorial means for sensing mechanical touching and generating an output in response to the mechanical touching;

support means for flexibly supporting said actuatable means, wherein said actuatable means are arranged in a surface area on said support means;

actuation means for receiving the input electronic image information and for actuating said actuatable means such that said actuatable means generates a representation of the image defined by the input electronic image information that is detectable from said actuatable means by touch; and evaluation means for evaluating said output generated by said sensorial means in response to the mechanical touching of said sensorial means and converting said output into electronic image information defining an image generated by the mechanical touching.

19. The display device according to claim 18, wherein said actuation means controls at least one set of parameters from a group consisting of (a) frequency and amplitude of the vibrations, (b) frequency and amplitude of the heat, and (c) frequency and amplitude of the electrical impulses.

20. The display device according to claim 18, wherein said actuatable means has a suction cup casing means for creating a suction on a skin.

21. A method for generating an image perceptibly representable for a sense of touch comprising:

generating, based on an electronic image information, a stream of signals carrying at least one of vibration, electrical impulses and heat information; and actuating a plurality of elements arranged on a surface area of a substrate, which are individually actuatable, based on said stream of signals, so that the elements generate a representation of an image defined by the electronic image information that is detectable from the elements by touch;

generating, by the elements, an output in response to mechanical contact of the elements; and converting the output from the elements to electronic image information defining an image generated by the mechanical contact.

22. The method according to claim 21, further comprising a step of controlling at least one parameter from a group consisting of (a) frequency and amplitude of the vibrations, (b) frequency and amplitude of heat, and (c) frequency and amplitude of the electric impulses applied to the elements.

23. The method according to claim 22, wherein the elements comprise sensor elements that are individually readable, the method further comprising:

scanning, through mechanical contact, the sensor elements that are individually readable to provide scanned information; and converting the scanned information, having vibration, electric impulses or heat information components, from the sensor elements to another electronic image information.

24. A display device, comprising:

a plurality of elements arranged on a surface area of a support, said elements being individually actuatable to generate on said surface area a representation of an image defined by input electronic image information, said representation of said image being adapted to be detected from said elements by touch; and an actuation device configured to receive the input electronic image information and to actuate said elements to generate the representation of the image defined by the input electronic image information that is detectable by touch, wherein said actuation device controls at least one parameter selected from the group consisting of (a) frequency and amplitude of vibrations, (b) frequency and amplitude of heat, and (c) frequency and amplitude of electric impulses.

25. The display device according to claim 24, wherein the input electronic information represented by the elements includes three dimensional properties or color differences that are detectable by touch from variation of said at least one parameter.

26. A method for generating an image perceptibly representable for a sense of touch comprising:

generating, based on electronic image information, a stream of signals carrying vibration, heat, or electrical impulses;

actuating a plurality of elements arranged on a surface area of a substrate, which are individually actuatable, based on the stream of signals, so that the elements generate a representation of an image defined by said electronic image information that is detectable from the elements by touch; and controlling at least one parameter from a group consisting of (a) frequency and amplitude of the vibrations, (b) frequency and amplitude of heat, and (c) frequency and amplitude of the electric impulses applied to the elements.

27. The method according to claim 24, wherein the input electronic information represented by the elements includes three dimensional properties or color differences that are detectable by touch from variation of the at least one parameter.

* * * * *